(12) United States Patent
Erickson et al.

(10) Patent No.: US 7,352,670 B2
(45) Date of Patent: Apr. 1, 2008

(54) SYSTEM AND METHOD FOR OPTICAL MEDIA INFORMATION STORAGE LIFE TRACKING

(75) Inventors: Dirk Erickson, Austin, TX (US); Robert A. Brondijk, Eindhoven (NL); Jaconus Petrus Josephus Heemskerk, Eindhoven (NL); Jakob G. Nijboer, Eindhoven (NL); Christiaan Steenbergen, Austin, TX (US); Charles R. Weirauch, Loveland, CO (US)

(73) Assignee: Dell Products LP., Round Rock, TX (US)

( * ) Notice: Subject to any disclaimer, the term of this patent is extended or adjusted under 35 U.S.C. 154(b) by 551 days.

(21) Appl. No.: 10/909,578

(22) Filed: Aug. 2, 2004

(65) Prior Publication Data

US 2006/0023595 A1    Feb. 2, 2006

(51) Int. Cl.
*G11B 7/00* (2006.01)
(52) U.S. Cl. .................. 369/53.2; 369/53.15
(58) Field of Classification Search ...... None
See application file for complete search history.

(56) References Cited

U.S. PATENT DOCUMENTS

| | | | |
|---|---|---|---|
| 4,792,933 A | 12/1988 | Suzuki | 369/32 |
| 5,513,160 A | 4/1996 | Satoh et al. | 369/47 |
| 5,835,465 A | 11/1998 | Yachida | 369/54 |
| 6,154,437 A | 11/2000 | Utsunomiya et al. | 369/275.2 |
| 6,407,976 B2 | 6/2002 | Nagara et al. | 369/116 |
| 6,445,669 B1 | 9/2002 | Hattori et al. | 369/116 |
| 6,469,968 B1 | 10/2002 | Van Den Enden et al. | 369/59.12 |
| 6,580,683 B1 * | 6/2003 | Braitberg et al. | 369/275.3 |

(Continued)

FOREIGN PATENT DOCUMENTS

| | | |
|---|---|---|
| JP | 04047557 | 2/1992 |
| JP | 04137262 | 5/1992 |

OTHER PUBLICATIONS

U.S. Appl. No. 10/361,284 entitled "Method and System for Time Compensation of Rc-Writable Optical Media Write Parameters" naming Christiann Steenbergen as inventor and filed Feb. 10, 2003.

(Continued)

*Primary Examiner*—Wayne Young
*Assistant Examiner*—Adam R. Giesy
(74) *Attorney, Agent, or Firm*—Hamilton & Terrile, LLP; Robert W. Holland

(57) ABSTRACT

Expiration information stored on an optical medium is applied to determine an expiration date of the optical medium that provides a predetermined reliability of information archived on the optical medium, such as a predetermined acceptable defect level of the information at the expiration date. An expiration engine associated with an information handling system or optical disc drive determines the expiration date from one or more factors, such as the manufacture date of read-only optical media, the initialization date of recordable optical media, a quality rating associated with a defect growth rate over time of the optical media, and a desired reliability. In one embodiment, the expiration engine writes expiration information to the optical media, such as a date stamp at initialization of a recordable optical medium. Alternatively, an expiration date is stored on an information handling system to provide expiration warnings a predetermined time before the expiration date.

21 Claims, 2 Drawing Sheets

U.S. PATENT DOCUMENTS

| | | | |
|---|---|---|---|
| 7,020,636 B2* | 3/2006 | Ohmori et al. | 705/51 |
| 7,177,261 B2* | 2/2007 | Thompson et al. | 369/275.1 |
| 2003/0067697 A1 | 4/2003 | Weinstein et al. | 360/31 |
| 2004/0254863 A1* | 12/2004 | Jones et al. | 705/29 |
| 2005/0195978 A1* | 9/2005 | Babic et al. | 380/231 |

OTHER PUBLICATIONS

U.S. Appl. No. 10/376,807 entitled "Method and System for Reconditioning Optical Storage Media to Write Updated Information" naming Dean Hendrickson, Hong-Jing (James) Lo, and Christiann Steenbergen as inventors and filed Feb. 28, 2003.

U.S. Appl. No. 10/688,237 entitled "Method and System for Setting Optical Drive Write Speed" naming Munif Farhan Halloush, Christiaan Steenbergen and Steve Kutz as inventors and filed Oct. 18, 2004.

* cited by examiner

SYSTEM AND METHOD FOR OPTICAL MEDIA INFORMATION STORAGE LIFE TRACKING

BACKGROUND OF THE INVENTION

1. Field of the Invention

The present invention relates in general to the field of storing information on optical media, and more particularly to a system and method for optical media information storage life tracking.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often generate relatively large quantities of information for storage, particularly in the use of multimedia applications, such as applications that generate or store picture, video or audio information. Although hard disc drive storage capacity has increased over the past several years to satisfy the permanent storage needs of many information handling system users, portable magnetic disc storage capacity has remained largely stagnant. As a result, information handling system users are increasingly turning to optical storage media as a more practical solution for storing information in a portable manner. Optical storage media generally stores information by modification of optical material with a laser and reads information by illuminating the optical material with the laser and measuring the laser light reflected from the optical material. Optical storage media come in a variety of forms including compact discs (CD) that use infrared lasers for storing and reading information, digital versatile discs (DVD) that use red lasers and Blu-Ray discs (BD) that use blue lasers for storing and reading information. As the wavelength of the laser decreases in size, the optical media is generally capable of storing greater quantities of information.

One difficulty with the use of optical media is that a wide variety of materials and designs are often used to manufacture optical media so that optical disc drives will often write information with varying quality to different optical media, depending upon the types of material and design used in the optical media. Manufacturers typically test each type of optical media as it becomes available in order to identify relevant characteristics of the optical media. For instance, manufacturers often develop specific write strategies that vary the parameters used to write information with the laser, such as the power setting for the laser, based on the characteristics of the optical media. Typically, such information is stored in optical disc drive firmware by association with a unique identification code for each type of optical media. The unique identification code is embedded in the optical media using a standardized format so that the optical disc drive is able to read the identification code from an inserted optical medium and lookup relevant information from the firmware.

Another difficulty that arises with the use of optical media is that optical media has a limited lifespan. Indeed, the specific lifespan of different types of optical media may vary substantially based on the quality of the materials and process used in manufacture. For instance, optical media fail after different life spans due to oxidation of underlying materials, such as aluminum, with the rate of oxidation dependent upon the degree to which impurities penetrate the optical media material. Although the typical life span of an optical media is generally many years, users have increasingly come to rely on optical media for archival purposes that involve long term storage of information. Even if information handling system users are aware of the limited life span of information archived on optical media so that the users will re-archive the information as the medium's useful life expires, the expiration of a particular optical medium may depend upon a number of factors that are difficult for a user to track, particularly over the extensive life of an optical medium. For instance, as an optical medium ages, the rate of errors increase so that a user may apply different expiration dates based on the relative importance of the information. As another example of the difficulty of tracking an optical medium's expiration, the expiration may vary depending upon the manufacture date of the optical medium, the initialization date on which a recordable or rewriteable optical medium is first written or stamped, or the number of times a rewriteable optical medium has information re-written.

SUMMARY OF THE INVENTION

Therefore a need has arisen for a system and method which tracks expiration of useful information storage lifespan for optical media.

In accordance with the present invention, a system and method are provided which substantially reduce the disadvantages and problems associated with previous methods and systems for determining the life span of optical media. Expiration information stored on an optical medium allows determination of an expiration date associated with the optical medium so that information is stored on the optical medium for a predetermined time period with a desired reliability.

More specifically, expiration information stored on an optical medium is applied by an expiration engine to determine an expiration date associated with the optical medium. For instance, a manufacture date of stamped read-only optical media is embedded at manufacture to use in the expiration date determination. Alternatively, an initialization date is written to recordable or rewriteable optical media by determining the first date that an optical medium is written to by an optical disc drive, such as with a clock of an information handling system associated with the optical disc drive. The expiration engine determines the expiration date of an optical medium from a variety of factors associated with the optical medium, such as its manufacture date, initialization date, number of writes, quality, defect growth rate and desired reliability for the stored information. The expiration date is stored for access by users, such as for periodic expiration warnings as optical media approach the expiration date. The expiration date is tracked by storage on the optical medium itself, in an information handling system memory or at a networked location.

The present invention provides a number of important technical advantages. One example of an important technical advantage is that optical media used for archival purposes automatically have useful storage life of information tracked. Automatic tracking of optical media expiration improves reliability of optical media for archival purposes and increases user confidence in the selection of optical media for long-term storage. As an optical medium's expiration approaches, a warning provided to the user allows re-allocation of stored information to alternative storage, such as a newer optical medium. The expiration dates of plural optical media are tracked in transferable host or networked applications so that expiration information remains viable over time. Automated computation of optical media expiration considers a variety of factors to present a user with simple expiration suggestions, such as by weighing the quality of the optical media, the history of writing information to the optical media and user-defined preferences relating the value of stored information with the probable rate of defect growth.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Information stored on optical media is protected from loss related to aging of the optical media reading expiration information from the optical media and applying the expiration information to determine an expiration date of the optical media. Information handling system users are thus able to track the life span over which the optical media will reliably store information and reallocate the information to other storage media before defects built-up in the optical media over time results in the loss of the information. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
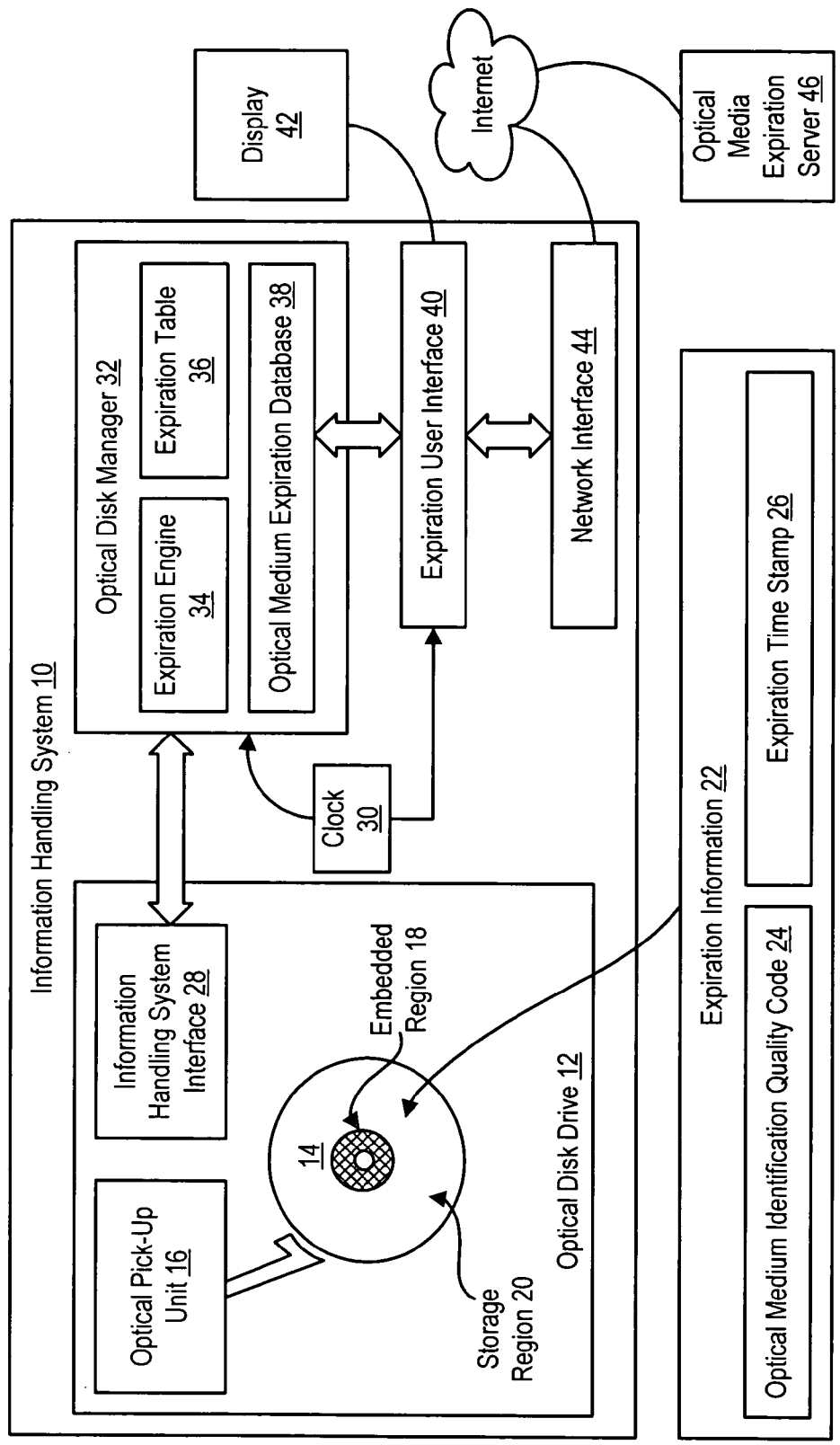
FIG. 1 depicts a block diagram of an information handling system having an optical disc drive configured to apply expiration information of an optical medium to determine an expiration date associated with information stored on the optical medium.

Referring now to FIG. 1, a block diagram depicts an information handling system 10 having an optical disc drive 12 configured to apply expiration information of an optical medium 14 to determine an expiration date associated with information stored on the optical medium, such as a BD, DVD or CD disc. Optical disc drive 12 has an optical pickup unit 16 that includes a laser, which illuminates optical medium 14, and an optical pickup, which receives and measures light reflected from optical medium 14 by the laser. Upon initial insertion of an optical medium, optical pickup unit 16 reads embedded information from an embedded region of optical medium 14 to configure itself for interacting with an information storage region 20 of optical medium 14 in an appropriate format, such as a BD, DVD or CD format. Embedded on optical medium 14 is expiration information 22, including an optical medium identification quality code 24 and an expiration time stamp 26. In the event that optical medium 14 is read only, expiration time stamp 26 is, for instance, the manufacture date or a predetermined expiration date stamped into the optical medium at manufacture. In the event that optical medium 14 is a recordable medium, such as a write (R) or rewritable (RW) medium, expiration time stamp 26 is written upon the initialization of optical medium 14 by optical disc drive 12. For instance, the information handling system interface 28 of optical disc drive 12 obtains the current date from a clock 30 and writes the current date in the expiration time stamp when optical medium 14 is first written. In alternative embodiments, alternative types of expiration information 22 may be embedded in or written to optical medium 14 as desired to predict the useful life of stored information.

Optical disc drive 12 information handling system interface 28 communicates with an optical disc manager 32 to manage expiration date tracking of plural optical media 14. Optical disc manager 32 is, for instance, a module associated with an operating system driver for optical disc drive 12, such as a module within the WINDOWS operating system. An expiration engine 34 receives the expiration information 22 read from optical medium 14, analyzes the expiration information to determine an expiration date and stores the expiration date in an expiration table 36, such as by association with a unique identification code of optical medium 14. In order to determine the expiration date, expiration engine 34 takes into account a number of factors including the manufacture date, initialization date, quality code and number or writes performed to the optical medium as tracked on the optical medium. The quality code information represents the defect growth rate associated with the optical medium and may be stored as a scaled score on optical medium 14 or looked-up using identification quality code 24 to lookup the quality information from an optical medium expiration database 38. The expiration date is essentially a prediction of the time period that will pass before defects of the stored information reach a threshold level that makes the information unreliable due to degradation of the material of the optical medium. In one embodiment, a user may select a desired reliability for stored information through an expiration user interface 40 and a display 42. Selection of higher reliability shortens optical medium life span to reduce the growth of defects before the expiration date while lower reliability selections increase the allowable life span of an optical medium before expiration.

In operation, optical disc manager detects insertion of optical medium 14 into optical disc drive 12 and obtains the expiration information with a read by optical pickup unit 16. Expiration engine 34 determines the expiration date of optical medium 14 and stores the expiration date in expiration table 36. In addition, expiration engine 34 may store the expiration date on optical medium 14 or through a network interface 44 to an optical media expiration server 46. As optical media expiration dates approach, expiration engine 34 outputs an expiration warning to the user of information handling system 10 through expiration user interface 40 and display 42. Remote storage of expiration dates on the optical media or optical media expiration server 46 ensure that active monitoring of expiration dates may be done by plural information handling systems. As time passes, expiration engine 34 may periodically update the expiration date based on the use of optical medium 14 or test reads to detect defects and verify the accuracy of the expected defect rate. For instance, expiration engine 34 periodically performs test reads and counts the number of defective data bytes on the optical medium or specific test parts. The test reads may be performed at specified time intervals or may involve sample reads from optical media inserted in the optical disc drive. Expiration engine 34 stores this information, such as in a field on the optical medium or in other non-volatile memory, and analyzes the detected defects to determine the defect growth rate associated with the test read. Expiration engine 34 issues an expiration warning when the defect growth rate exceeds a pre-determined value for a particular optical medium based, for instance, on the type of usage of the optical medium. Additionally, expiration engine 34 monitors optical media type to verify that the expected defect rate associated with that type is consistent with the predicted defect rate and, if the actual defect rate differs from the expected rate, adjusts the expiration dates of other optical media of that type to correspond with actual detected defect rates.

Figure 2:
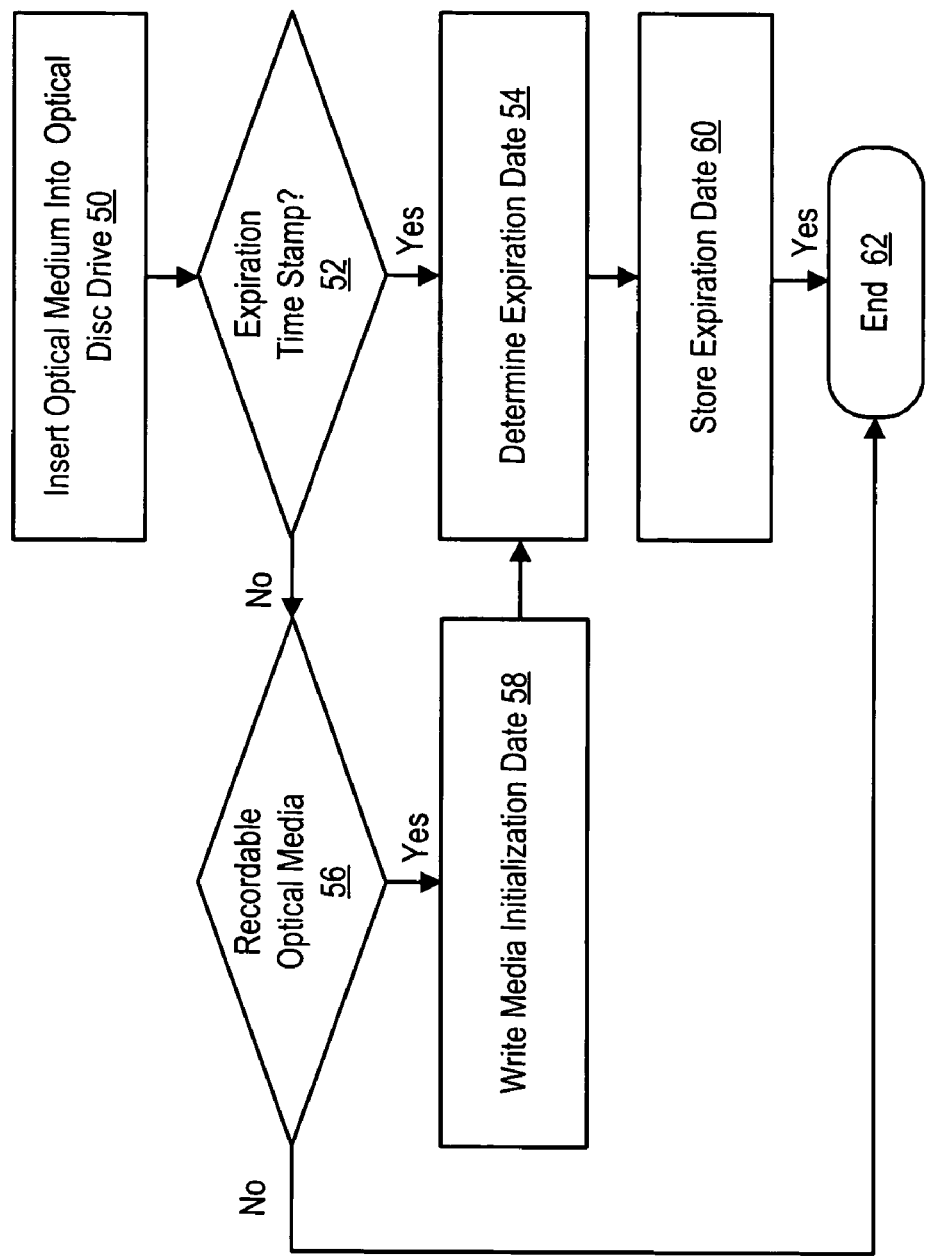
FIG. 2 depicts a flow diagram of a process to apply expiration information to determine an optical medium's expiration date.

Referring now to FIG. 2, a flow diagram depicts a process to apply expiration information to determine an optical medium's expiration date. The process begins at step 50 with insertion of an optical medium in an optical disc drive and continues to step 52 at which the optical disc drive expiration information is read by the optical disc drive. If an expiration time stamp is found on the optical medium, the process continues to step 54 for a determination of the expiration date. If at step 52 the expiration time stamp is not found, the process continues to step 56 to determine if the optical medium is recordable. If the optical medium is not recordable, the process ends at step 62 without an expiration date. If at step 56 the optical medium is recordable, the process continues to step 58 at which the current date is written as the initialization date in the expiration time stamp and the optical medium is initialized. At step 54, the initialization date is used to determine the expiration date. After the expiration date is determined, the process continues to step 60 for storage of the expiration date to allow tracking of the useable life span of the optical medium.

Although the present invention has been described in detail, it should be understood that various changes, substitutions and alterations can be made hereto without departing from the spirit and scope of the invention as defined by the appended claims.

What is claimed is:

1. An information handling system comprising:
    an optical disc drive having an optical pickup unit operable to read information from an optical medium;
    an optical disc manager interfaced with the optical pickup unit and operable to manage a read by the optical pickup unit of expiration information from the optical medium; and
    an expiration engine associated with the optical disc manager and operable to apply the expiration information to determine an expiration date for information stored on the optical medium:
    wherein the expiration information comprises a time stamp of a predetermined time, an identification code of the optical medium and a reliability factor associated with an acceptable number of defects, the expiration engine further operable to apply a defect rate associated with the identification code and the time stamp to determine an expiration date associated with the acceptable number of defects.

2. The information handling system of claim 1 wherein the expiration information comprises an initialization date of the optical medium.

3. The information handling system of claim 2 wherein the optical medium comprises a recordable optical medium and the initialization date of the optical medium is the date information is first written to the optical medium.

4. The information handling system of claim 3 wherein the recordable optical medium is a rewriteable optical medium and the expiration information further comprises one or more of the last date information is written and the number of information writes.

5. The information handling system of claim 1 wherein the identification code comprises an optical medium quality rating.

6. The information handling system of claim 1 further comprising:
    an expiration table operable to track expiration dates of plural optical media that interface with the optical disc drive; and
    an expiration user interface operable to present the expiration table for display to a user.

7. The information handling system of claim 6 wherein the expiration user interface is further operable to present an expiration warning to the user a predetermined time period before the expiration date of one or more of the plural optical media.

8. The information handling system of claim 6 wherein the expiration table comprises a storage location networked with the information handling system.

9. A method for managing optical media information storage expiration, the method comprising:
    reading expiration information from an optical medium with an optical disc drive; and
    applying the expiration information to determine an expiration date associated with a predetermined number of defects for information stored on the optical media.

10. The method of claim 9 wherein:
    the optical medium is a read-only optical medium having stamped information; and
    the expiration information comprises a manufacture date of the optical medium stamped at manufacture of the optical medium.

11. The method of claim 9 wherein the optical medium comprises a recordable optical medium, the method further comprising:

determining that the optical medium is not initialized;

determining the current date;

writing the current date to the optical medium expiration information as the initialization date; and applying the initialization date to determine the expiration date.

12. The method of claim 11 wherein the optical medium further comprises a rewriteable optical medium, the method further comprising:

tracking the number of writes to the rewriteable optical medium; and applying the number of writes to determine the expiration date.

13. The method of claim 9 wherein the expiration information comprises a quality rating associated with the optical medium, the method further comprising applying the quality rating to determine the expiration date.

14. The method of claim 9 further comprising:

accepting a user-input information storage reliability factor associated with the optical medium; and applying the reliability factor to determine the defect level.

15. The method of claim 9 further comprising:

storing the expiration date; and presenting an expiration warning within a predetermined period of the expiration date.

16. The method of claim 15 wherein storing the expiration date further comprises storing the expiration date on the optical medium.

17. The method of claim 15 wherein storing the expiration date further comprises storing the expiration date on an information handling system associated with the optical disc drive.

18. The method of claim 15 wherein storing the expiration date further comprises storing the expiration date at a networked location interfaced with the optical disc drive.

19. The method of claim 9 wherein the optical medium comprises a blue laser DVD.

20. The method of claim 9 further comprising:

performing test reads from the optical medium to detect defects; and adjusting the expiration date of the optical medium based on the detected defects.

21. The method of claim 20 further comprising:

providing an expiration warning if the defect rate exceeds a predetermined amount.

* * * * *